(12) United States Patent
Tyler

(10) Patent No.: US 6,499,434 B1
(45) Date of Patent: Dec. 31, 2002

(54) DOG KENNEL

(76) Inventor: Steven Tyler, 1164 Harold Ave., Roscommon, MI (US) 48653

( * ) Notice: Subject to any disclaimer, the term of this patent is extended or adjusted under 35 U.S.C. 154(b) by 0 days.

(21) Appl. No.: 09/767,275

(22) Filed: Jan. 23, 2001

(51) Int. Cl.[7] .............................. A01K 31/07; B60R 7/00
(52) U.S. Cl. ...................... 119/453; 119/496; 296/37.6; 296/24.2
(58) Field of Search ................................. 119/453, 496; 296/37.6, 24.1, 24.2; D30/108

(56) References Cited

U.S. PATENT DOCUMENTS

| | | | |
|---|---|---|---|
| 1,550,829 A | | 8/1925 | McBride |
| 1,754,610 A | | 4/1930 | Clayton |
| 1,813,458 A | | 7/1931 | Meurer |
| 1,847,425 A | | 3/1932 | Barlett |
| 2,090,815 A | | 8/1937 | Simmons, Jr. |
| 2,897,781 A | | 8/1959 | Olsen |
| 3,363,800 A | | 1/1968 | Anderson |
| 3,662,712 A | | 5/1972 | Singer |
| 3,773,017 A | | 11/1973 | Johannes |
| 4,546,728 A | | 10/1985 | May |
| 4,824,157 A | * | 4/1989 | Nielsen et al. ................ 296/10 |
| 4,870,925 A | | 10/1989 | Troutman |
| 5,065,699 A | * | 11/1991 | Marshall ..................... 119/453 |
| 5,147,103 A | * | 9/1992 | Ducote ........................ 119/453 |
| D333,537 S | | 2/1993 | Muse, Jr. |
| D397,082 S | * | 8/1998 | Kunkel ........................ D12/406 |
| 5,800,145 A | * | 9/1998 | Kelce .......................... 410/121 |
| D403,129 S | | 12/1998 | Mentz |
| D414,302 S | * | 9/1999 | Potestio ..................... D30/108 |

* cited by examiner

Primary Examiner—Charles T. Jordan
Assistant Examiner—Kimberly S. Smith
(74) Attorney, Agent, or Firm—Reising, Ethington, Barnes, Kisselle, Learman & McCulloch, P.C.

(57) ABSTRACT

The kennel for mounting on a pick-up truck has left and right kennel support plates. Front and rear trusses have their ends fixed to the left and right support plates. A roof panel is attached to the front and rear trusses. A rear wall is pivotally attached to the rear truss and extends vertically downward from a horizontal pivot axis when in a closed position. The rear wall pivots about the pivot axis to a vertical position above the pivot axis and adjacent to the rear side of the rear truss to provide ingress and egress. Side openings in the kennel permit a dog to extend his nose and at least part of his head from the kennel. An adjustable bar changes the height and the size of each side opening. The support plates hold the entire weight of the kennel.

16 Claims, 3 Drawing Sheets

US 6,499,434 B1

DOG KENNEL

TECHNICAL FIELD

This invention relates to a dog kennel that is mounted in the box of a pick-up truck.

BACKGROUND OF THE INVENTION

Dogs are occasionally transported in the box of pick-up trucks. Without some restraint there is a chance that dogs will fall out or possibly jump out while the truck is moving. Restraints such as ropes and chains are generally either too confining or they can cause injury to the dog they are intended to protect. Any restraint that encircles the neck of a dog has the potential to cause injury or even death. Such restraints are particularly hazardous to dogs when used in moving vehicles.

Containers with tops, bottoms and four sidewalls are often used when transporting dogs. Many of these containers do not provide sufficient space for a dog to stand and substantially restrict movement. They can also have ventilation problems as well as temperature problems. In the summer dogs can become overheated. In the winter they can freeze. Dogs will often resist going into containers that are too confining. Containers with four walls, a floor and a top that hold multiple dogs and provide some freedom of movement are relatively heavy. Their weight complicates the task of moving them into or out of a truck box. Their size limits or even prevents the transport of other cargo. It may be necessary to remove such containers when transporting other cargo and to leave the dog or dogs at home.

Vehicle mounted kennels have been proposed which employ a pick-up truck box to provide a floor, a portion of the side walls and a portion of the front wall. Such kennels have the advantage of providing space for a dog to stand and move around and to also see where the vehicle is going. Due to the variation in the size and dimensions of pick-up truck boxes these kennels have been custom made for specific truck models by given manufacturers. There are a large number of truck models available on the market today. To custom make a kennel to fit each size and style would be demanding in time and effort and relatively expensive. Such an effort would be complicated by the fact that some truck boxes are equipped with floor protection mats, bed liners that fit under side rails or bed liners with upper flanges that rest on the top rails of box side walls. The variable thickness of floor protection mats and the variations in bed liners complicates the problems by changing the effective inside width and depth of truck boxes. The large numbers of variations has made it very difficult to make a kennel that will fit a large number of pick-up truck boxes without substantial field modifications.

Vehicles are subjected to shaking, vibrations, wind and other forces that tend to damage vehicle mounted kennels. Many of the kennels proposed in the past have had structural problems that have reduced their ability to withstand the forces to which vehicles are subjected. These problems have in some cases endangered dogs. In other cases structural problems have merely reduced the useful life of vehicle mounted kennels.

SUMMARY OF THE INVENTION

The dog kennel has a front truss with a front bowed beam and a front horizontal beam connected to the front bowed beam. A rear truss includes a rear bowed beam and a rear horizontal beam connected to the rear bowed beam. A left support plate is fixed to a left end of the front truss and the left end of the truss. A right support plate is fixed to the right end of the front truss and to the right end of the rear truss. A roof panel is attached to the front truss and the rear truss. A rear wall is suspended from the rear truss. During use, the entire kennel is supported by the left support plate and the right support plate.

BRIEF DESCRIPTION OF THE DRAWINGS

The presently preferred embodiment of the invention is disclosed in the following description and in the accompanying drawings, wherein.

DETAILED DESCRIPTION OF THE PREFERRED EMBODIMENT

Figure 1:
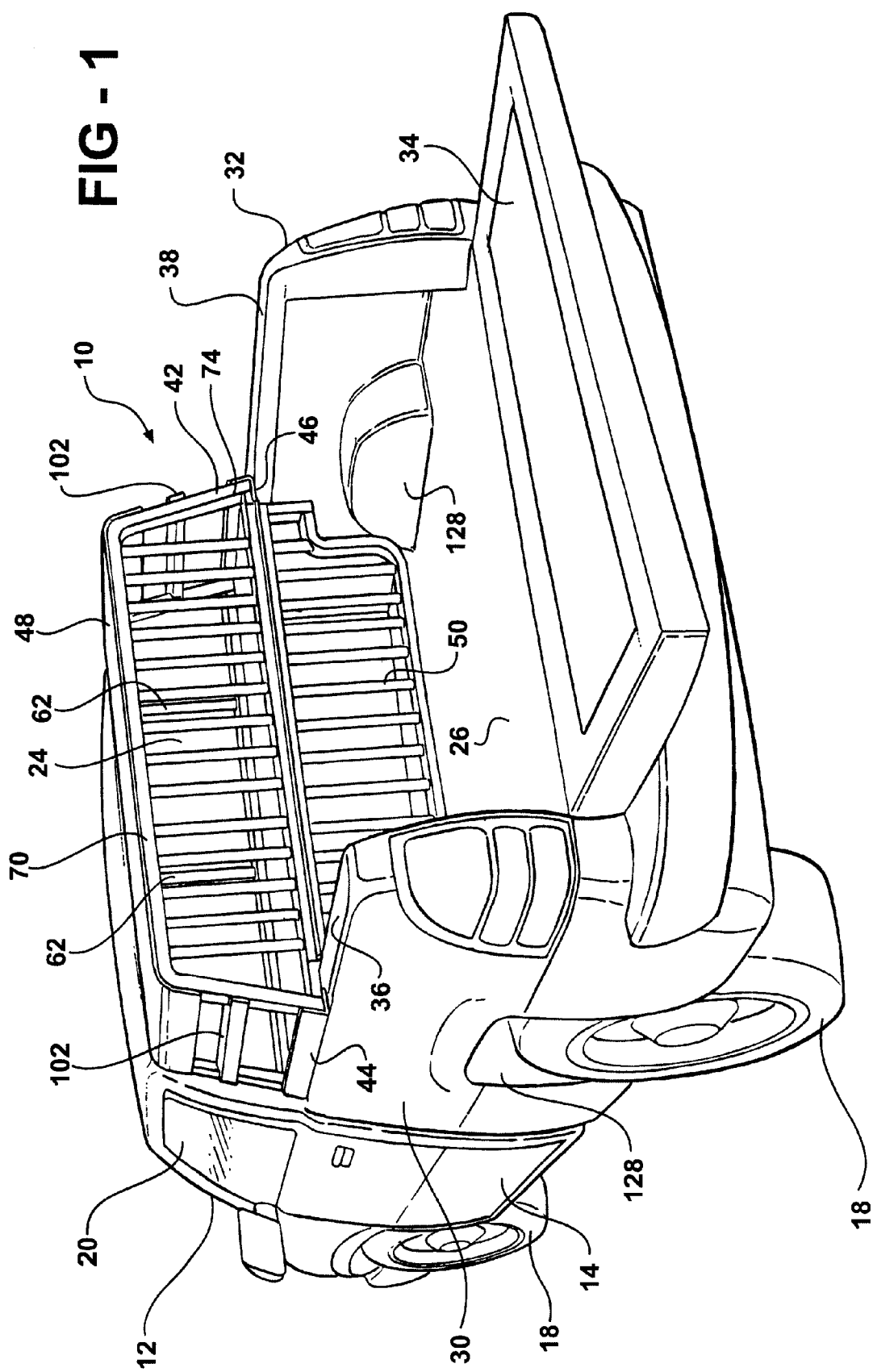
FIG. 1 is a perspective view of the rear and left side of the kennel mounted in the box of a pick-up truck.

The kennel 10, as shown in FIG. 1 is mounted in the pick-up truck 12. The truck 12 includes cab 14 and a pick-up truck box 16 mounted on a vehicle chassis with wheels 18. The cab 14 has an operator's station, side windows 20, a windshield 22 and a rear window 24. The rear window 24 may be fixed or it may have a center section that can be opened.

Figure 4:
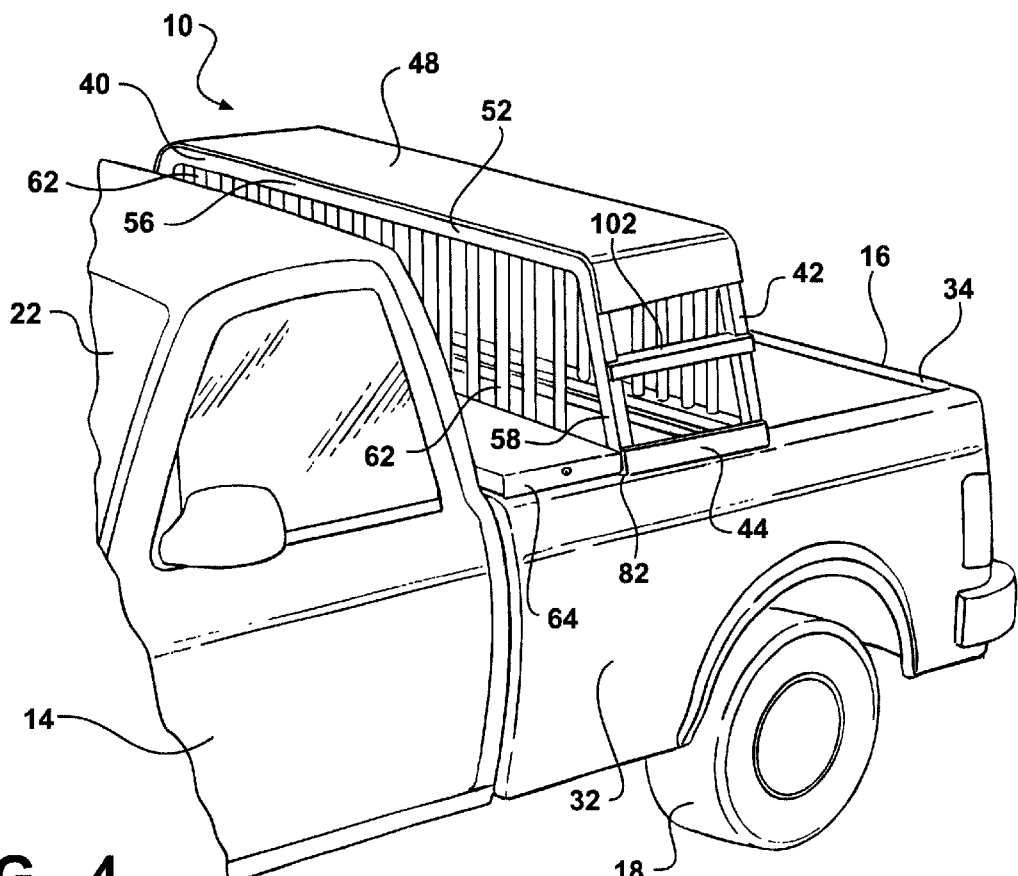
FIG. 4 is a perspective view of the kennel in a pick-up truck and with a storage container between the kennel and the front wall of the pick-up truck box.

The truck box 16 has a floor 26, a front wall 28, side walls 30 and 32 and a tail gate 34. The side walls 30 and 32 have top rails 36 and 38. The tailgate 34 can be latched in a vertical closed position as shown in FIG. 4 or open as shown in FIG. 1.

The kennel 10 has a front truss 40 and a rear truss 42. The left and right ends of the front and rear trusses 40 and 42 are connected to left and right side rail engaging kennel support plates 44 and 46. A roof panel 48 is secured to the top of the front truss 40 and the rear truss 42. A rear wall 50 is suspended from the rear truss 42 and extends vertically downward from the rear truss.

Figure 2:
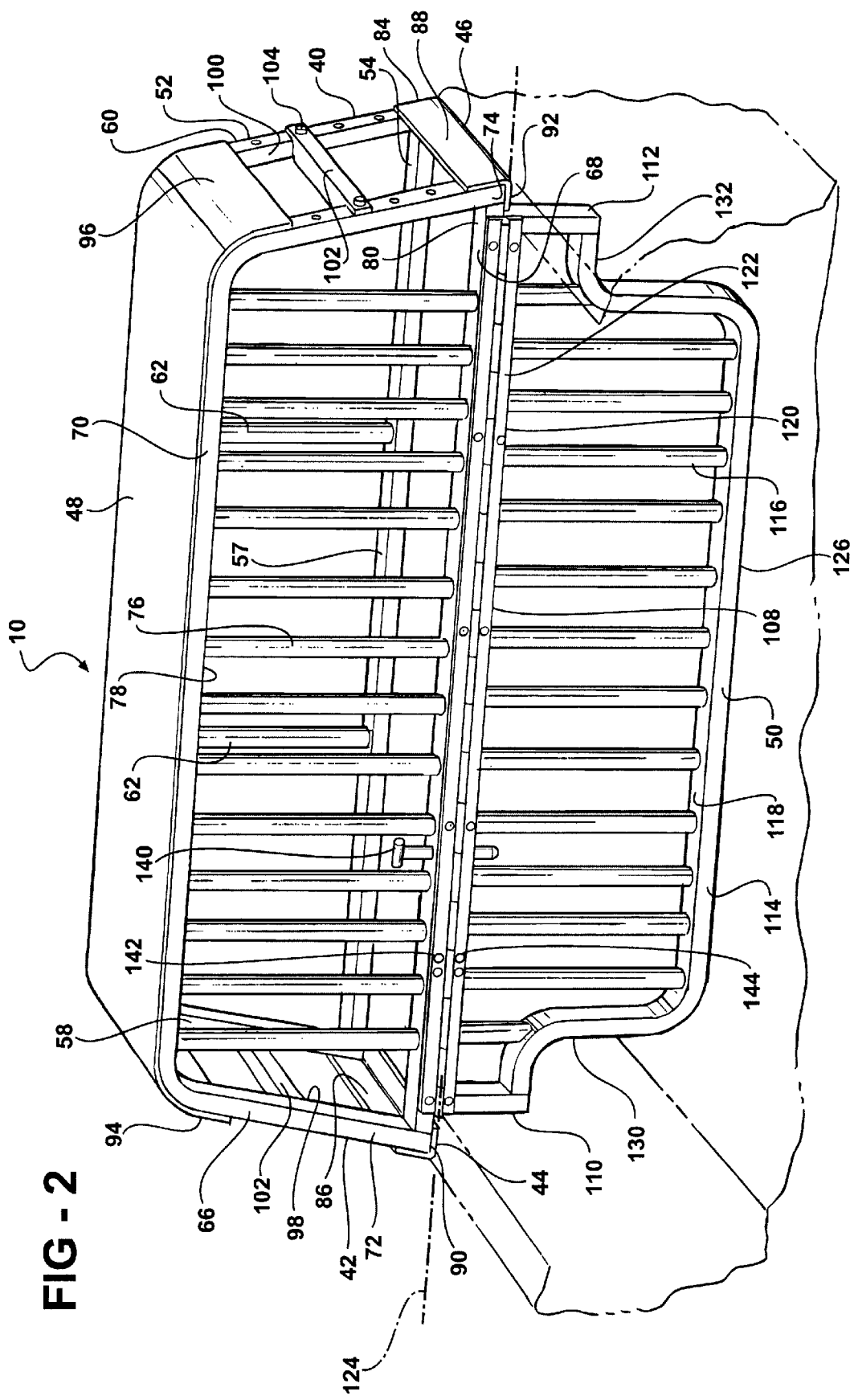
FIG. 2 is an enlarged perspective view of the kennel with a portion of a truck box shown in phantom lines.

The front truss 40 includes a front bowed beam 52 and a front horizontal beam 54. The front beams 52 and 54 are preferably rectangular or square tubing. The front bowed beam 52 has a generally horizontal center portion 56, a left end 58 that extends downwardly and outward from the center portion, and a right end 60 that extends downwardly and outward from the center portion. Preferably the front bowed beam 52 has a silhouette that is similar to the rear silhouette of the upper portion of the cab 14. The front horizontal beam 54 has its ends fixed to the outer ends of the front bowed beam 52. Two brace members 62 of the front truss 40 are connected to the front bowed beam 52 and the front horizontal beam 54 as shown in FIGS. 1 and 2. These brace members 62 are round pipes with an outside diameter that is the same as the inside width of the tubular front bowed beam 52 and the tubular front horizontal beam 54. Vertically aligned holes are bored through the horizontal top wall 57 of the front horizontal beam 54 and the horizontal bottom wall 59 of the front bowed beam 52. The two brace members 62 are vertical as shown in FIGS. 1 and 2 and are welded in place. The two brace members 62 are spaced apart so that they do not interfere with an openable window portion provided in the center of the rear window 24 of some pick-up trucks 12. Additional vertical brace members 62 may be provided in the front truss 40 as shown in FIG. 4 if desired. The kennel 10 is moved rearward from the cab 14 as shown in FIG. 4 to make room for a storage container 64. The additional vertical brace members 62 keep dogs from leaving the kennel through the front truss 40. To obtain additional strength, the brace members 62 can be solid rods rather than pipes.

The rear truss 42 has a rear bowed beam 66 and a rear horizontal beam 68 that are substantially identical to the front bowed beam 52 and the front horizontal beam 54. Rear bowed beam 66 is a square or rectangular tube with a generally horizontal center portion 70, a left end 72 that extends downwardly and outwardly from the center portion and a right end 74 that extends downwardly and outwardly from the center portion. The rear horizontal beam 68 has its ends fixed to the outer ends of the bowed beam 66. A plurality of round vertical pipes 76 pass through bores through the bottom wall 78 of rear bowed beam 66 and the upper wall 80 of the rear horizontal beam 68. These vertical pipes 76 have an outside diameter that is about the same as the inside width of the tubular passage in the tubular beams 66 and 68. The vertical pipes 76 are then welded in place. This construction eliminates the need to employ fixtures to position the vertical pipes 76. If desired, the pipes 76 could be solid rods.

The front truss 40 is welded to the front ends 82 and 84 of left and right kennel support plates 44 and 46. The rear truss 42 is welded to the rear ends 90 and 92 of the kennel support plates 44 and 46. Both kennel support plates 44 and 46 are L-shaped members with their generally vertical legs 86 and 88 fixed to the ends of the front and rear trusses 40 and 42. Both the front and the rear trusses 40 and 42 are held in spaced apart generally vertical positions relative to each other by the kennel support plates 44 and 46.

A roof panel 48 is secured to the front truss 40 and the rear truss 42. End portions 94 and 96 of the roof panel 48 extend vertically down the left and right ends of the front and rear trusses 40 and 42. These end portions 94 and 96 add strength and rigidity to the kennel. The end portions 94 and 96 also provide additional shade for dogs in the kennel.

A left side opening 98 and a right side opening 100 are provided in the kennel 10 to permit dogs to stick their noses or heads out of the kennel and to see out. The left side opening 98 is between the front truss 40 and the rear truss 42 and between the leg 86 of the kennel support plate 44 and the end portion 94 of the roof panel 48. The right side opening 100 is between the front truss 40 and the rear truss 42 and between the leg 88 of the kennel support plate 46 and the end portion 96 of the roof panel 48. To keep dogs from jumping out of the kennel 10 and to protect them from injury an adjustable bar 102 is connected to the front truss 40 and the rear truss 42 by bolts 104 to change the size of the side openings 98 and 100. The positions of the bars 102 are adjustable to accommodate various size dogs. Additional bars 102 can be added if required to keep small dogs in the kennel 10.

A rear wall 50 is suspended from the rear truss 42. Rectangular tubes 108, 110, 112 and 114 encircle the entire rear wall 50. Vertical round tubes 116 pass through bores in an upper wall 118 of the rectangular tube 114 and through bores through a lower wall 120 of the rectangular tube 108 and are welded in place. The tubes 116 have an outside diameter that is less than the inside width of the passage through the rectangular tubes 108 and 114.

Figure 3:
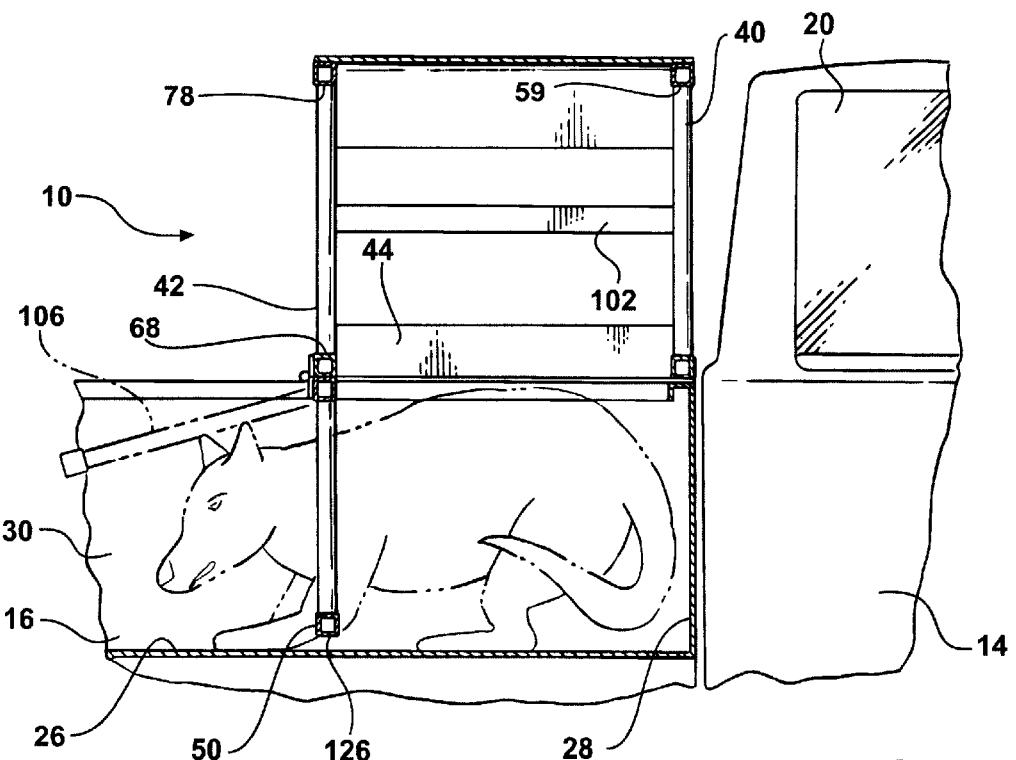
FIG. 3 is a vertical sectional view of the kennel showing the rear wall in two different positions and a large dog in phantom lines leaving the kennel.

A piano hinge 122 pivotally attaches the rear wall 50 to the rear truss 42. The piano hinge 122 has a horizontal pivot axis 124 that is at the same vertical height as the kennel support plates 44 and 46. The piano hinge permits the rear wall 106 to pivot between a position extending vertically downward from the rear horizontal beam 68 and a position extending vertically upward from the pivot axis 124 and adjacent to a rear side of the rear truss 42. The bottom 126 of the rear wall 50 is positioned a short distance above the floor 26 of the box 16 as shown in FIG. 3. The space between the rear wall 106 and the floor 26 is sufficient to accommodate floor pads, bed liners and some variation in the height of the side walls 30 and 32.

Wheel wells 128 extend inward from the side walls 30 and 32 and upward from the floor 26 of the box 16 as shown in FIG. 1. Left and right wheel well recesses 130 and 132 are provided in the rear wall 50 to accommodate wheel wells 128.

The left side rail engaging support plate 44 and the right side rail engaging support plate 46 sit on the top rails 36 and 38 of the truck box 16 and support the entire weight of the kennel 10. The support plates 44 and 46 are the only surfaces on the kennel that contact the truck 12. If a bed liner is used that covers the top rails 36 and 38, the plates 44 and 46 sit on the bed liner rail covers. Clamps or bolts (not shown) secure the kennel to the rails 36 and 38.

The front and rear trusses provide sufficient strength to permit some cargo to be carried by the roof panel 48.

The kennel 10, when made from aluminum or a similar light weight material, can easily be mounted on and removed from a truck 12 by one person.

A pin 140 passes through the rear horizontal beam 68 and the rectangular tube 108 to hold the rear wall 50 in a door closed position as shown in FIG. 2. The pin 140 passes through bores 142 and 144 to hold the rear wall 106 in a door open position. When the rear wall 106 is extending upward from the hinge axis 124, the kennel 10 is a relatively small compact package for storage and transport. In the door open position, the rear wall 106 permits the entire length of the floor 26 to be used to transport long items such as plywood sheets without removing the kennel.

The kennel can be easily modified to provide a fixed rear wall 50 if desired. The round pipes 76 can be lengthened, pass through the horizontal beam 68, and extend into the rectangular tube 114. With this modification the hinge 122 as well as the rectangular tube 108 could be eliminated. An alternate door would then be required.

The disclosed embodiment is representative of a presently preferred form of the invention, but is intended to be illustrative rather than definitive thereof. The invention is defined in the claims.

What is claimed is:

1. A dog kennel comprising:
    a front truss including a front bowed beam, a front horizontal beam connected to the front bowed beam, and a plurality of front truss brace members extending generally vertically downward from the front bowed beam to the front horizontal beam;
    a rear truss including a rear bowed beam and a rear horizontal beam connected to the rear bowed beam;
    a left support plate fixed to a left end of the front truss and the left end of the rear truss;
    a right support plate fixed to a right end of the front truss and to the right end of the rear truss;

a roof panel attached to the front truss and the rear truss;

a rear wall suspended from the rear truss; and wherein the entire kennel is supported by said left support plate and said right support plate.

2. A dog kennel as set forth in claim 1 wherein the rear wall is pivotally attached to the rear truss for pivotal movement about a horizontal axis between a down position generally below said left and right support plates and a raised position generally above said left and right support plates.

3. A dog kennel as set forth in claim 1 wherein a left end of the rear wall has a left wheel well recess and a right end of the rear wall has a right wheel well recess.

4. A dog kennel as set forth in claim 1 including a first animal head passage between the roof panel and the left support plate and between the front truss and the rear truss.

5. A dog kennel as set forth in claim 4 including a second animal head passage between the roof panel and the right support plate.

6. A dog kennel as set forth in claim 5 wherein the first animal head passage and the second animal head passage both have an adjustable bar for adjusting the size of the first and second animal head passages.

7. A dog kennel for mounting on a pick-up truck, to the rear of a truck cab, and upon a truck box having a floor, a front wall, side walls and side wall top rails comprising:

a left side rail engaging kennel support plate with a left plate front end and a left plate rear end;

a right side rail engaging kennel support plate with a right plate front end and a right plate rear end;

a front truss having a front bowed beam, a front horizontal beam connected to a front bowed beam left end and a front bowed beam right end and at least one generally vertical brace member having an upper brace end connected to the front bowed beam and a lower brace end connected to the front horizontal beam and wherein said front truss is fixed to the left plate front end and the right plate front end;

a rear truss having a rear bowed beam, a rear horizontal beam connected to a rear bowed beam left end and a rear bowed beam right end, and a plurality of generally vertical rear rods connected to the rear bowed beam and the rear horizontal beam and wherein said rear truss is fixed to the left plate rear end and the right plate rear end;

a roof panel secured to the front bowed beam and to the rear bowed beam;

a left side opening between said front truss and said rear truss and between the roof panel to the left side rail engaging kennel support plate;

a right side opening between said front truss and said rear truss and between the roof panel and the right side rail engaging kennel support plate; and a rear wall extending downward from said rear truss and supported by the rear truss.

8. A dog kennel as set forth in claim 7 including at least one left side opening bar connected to said front truss and to said rear truss to reduce the size of the left side opening, and at least one right side opening bar connected to said front truss and to said rear truss to reduce the size of the right side opening.

9. A dog kennel as set forth in claim 7 wherein the front truss has a plurality of brace members connected to the front bowed beam and to the front horizontal beam.

10. A dog kennel as set forth in claim 9 wherein the plurality of brace members extend vertically downward from the front bowed beam to the front horizontal beam.

11. A dog kennel as set forth in claim 7 wherein said rear wall is pivotally connected to the rear truss for pivotal movement about a horizontal axis and forms a door.

12. A dog kennel as set forth in claim 11 including a lock pin that locks the rear wall in a vertical position.

13. A dog kennel as set forth in claim 7 wherein a bottom edge of said rear wall is spaced from said floor of the truck box.

14. A dog kennel as set forth in claim 7 wherein a left end of said rear wall has a left wheel well recess and a right end of said rear wall has a right wheel well recess.

15. A dog kennel as set forth in claim 7 wherein the entire weight of said dog kennel is supported by said left and right side rail engaging kennel support plates.

16. A dog kennel comprising:

a front truss that is generally vertical and includes a front bowed beam, a front horizontal beam connected to the front bowed beam, and at least one generally vertical front truss brace member having an upper brace end connected to the front bowed beam and a lower brace end connected to the front horizontal beam;

a rear truss that is generally vertical and includes a rear bowed beam and a rear horizontal beam connected to the rear bowed beam;

a left support plate fixed to a left end of the front truss and a left end of the rear truss;

a right support plate fixed to a right end of the front truss and to a right end of the rear truss;

a roof panel attached to the front truss and the rear truss;

a rear wall suspended from the rear truss; and wherein the entire kennel is supported by said left support plate and said right support plate.

* * * * *